United States Patent
Connolly et al.

(10) Patent No.: US 9,246,417 B1
(45) Date of Patent: Jan. 26, 2016

(54) SYSTEM AND METHOD FOR REGENERATIVE BRAKING

(71) Applicant: FORD GLOBAL TECHNOLOGIES, LLC, Dearborn, MI (US)

(72) Inventors: Francis Thomas Connolly, Ann Arbor, MI (US); Bernard D Nefcy, Novi, MI (US); Zhengyu Dai, Canton, MI (US)

(73) Assignee: FORD GLOBAL TECHNOLOGIES, LLC., Dearborn, MI (US)

( * ) Notice: Subject to any disclaimer, the term of this patent is extended or adjusted under 35 U.S.C. 154(b) by 0 days.

(21) Appl. No.: 14/468,428

(22) Filed: Aug. 26, 2014

(51) Int. Cl.
*H02P 3/14* (2006.01)
*B60L 7/26* (2006.01)
*B60L 7/18* (2006.01)
*B60L 7/24* (2006.01)
*B60W 30/18* (2012.01)

(52) U.S. Cl.
CPC ... *H02P 3/14* (2013.01); *B60L 7/18* (2013.01); *B60L 7/24* (2013.01); *B60W 30/18127* (2013.01); *Y10S 903/947* (2013.01)

(58) Field of Classification Search
CPC .............. H02P 3/14; Y10S 903/947; B60W 30/18127; B60L 7/18; B60L 7/24
See application file for complete search history.

(56) References Cited

U.S. PATENT DOCUMENTS

| | | | |
|---|---|---|---|
| 5,511,859 A | 4/1996 | Kade et al. | |
| 5,839,800 A * | 11/1998 | Koga et al. | 303/152 |
| 5,967,621 A * | 10/1999 | Ito et al. | 303/15 |
| 6,543,565 B1 | 4/2003 | Phillips et al. | |
| 6,811,229 B2 * | 11/2004 | Soga | 303/152 |
| 7,421,326 B2 * | 9/2008 | Thor et al. | 701/67 |
| 7,823,471 B2 * | 11/2010 | Tamai et al. | 74/89.4 |
| 8,437,937 B2 * | 5/2013 | Ganley et al. | 701/70 |
| 8,540,604 B1 | 9/2013 | Nefcy et al. | |
| 2005/0143877 A1 * | 6/2005 | Cikanek et al. | 701/22 |
| 2009/0018716 A1 | 1/2009 | Ambrosio | |
| 2011/0304288 A1 * | 12/2011 | Saida | 318/376 |
| 2012/0158266 A1 * | 6/2012 | Miyazaki et al. | 701/70 |
| 2013/0087425 A1 | 4/2013 | Frait et al. | |

FOREIGN PATENT DOCUMENTS

| | | | |
|---|---|---|---|
| EP | 2055568 B1 | | 8/2013 |
| JP | 2006-160130 | * | 6/2006 |

* cited by examiner

*Primary Examiner* — Michael J Zanelli
(74) *Attorney, Agent, or Firm* — Carlson, Gaskey & Olds, P.C.

(57) ABSTRACT

One exemplary aspect of this disclosure relates to a method including the step of controlling a level of regenerative torque to at least partially meet a braking request. The level of regenerative torque is gradually introduced at a controlled rate.

16 Claims, 5 Drawing Sheets

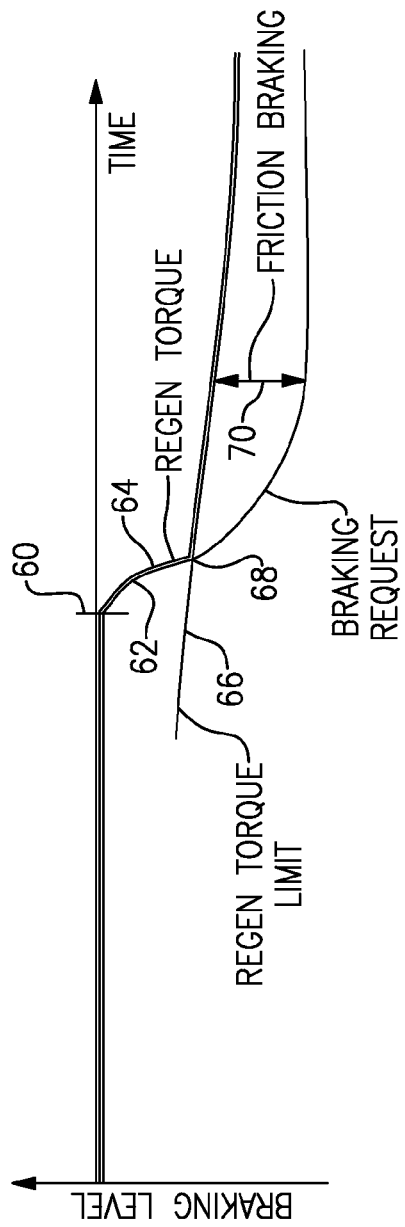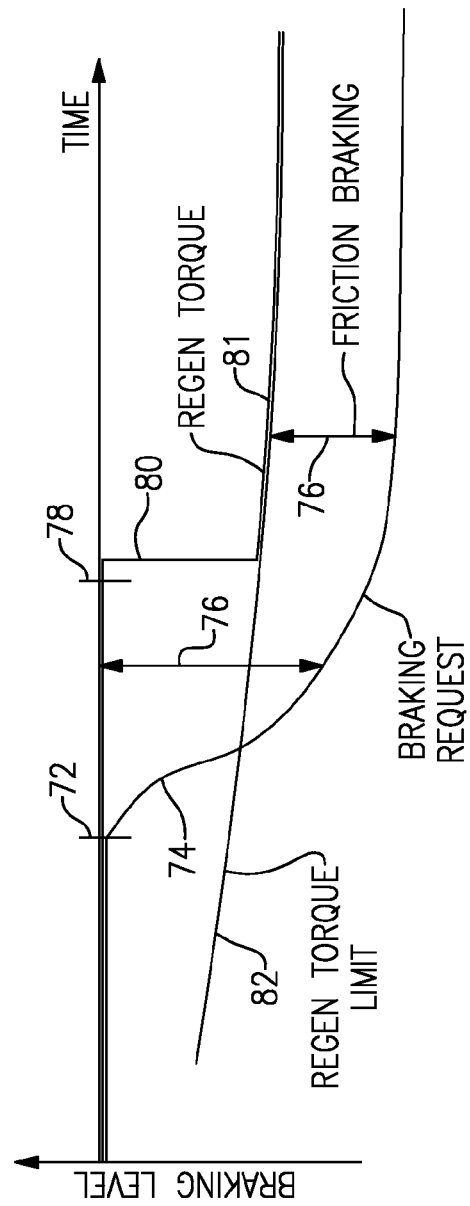
FIG.1A (Prior Art)
FIG.1B (Prior Art)

SYSTEM AND METHOD FOR REGENERATIVE BRAKING

BACKGROUND

In many electrified vehicles, including hybrid electric vehicles, energy that places the vehicle in motion is partially recovered during vehicle braking using what is known as regenerative braking. Regenerative braking can be achieved during braking by configuring the drive motor as a generator. The act of generating power with the motor creates a braking torque, or regenerative torque, on the motor. Regenerative torque is transmitted to the wheels to slow the vehicle. In many situations, regenerative torque alone cannot meet a braking request and, therefore, the regenerative torque is combined with friction braking (e.g., disc or drum braking).

In some known systems, such as that which is graphically illustrated in FIG. 1A, the driveline between the wheels and the motor is fully locked. In this system, when a user initiates a braking request (e.g., presses the brake pedal), the driveline will transmit regenerative torque from the motor to the wheels. In another known system, such as the system graphically illustrated in FIG. 1B, a torque converter between the motor and the wheels must be fully locked (e.g., by actuating a torque converter bypass clutch, for example), before any regenerative torque is applied. After the torque converter is fully locked, the regenerative torque is introduced abruptly, at a level equivalent to a regenerative torque limit.

SUMMARY

One exemplary aspect of this disclosure relates to a method including the step of controlling a level of regenerative torque to at least partially meet a braking request. The level of regenerative torque is gradually introduced at a controlled rate.

In a further non-limiting embodiment of the foregoing method, regenerative torque is introduced before a torque converter is fully locked.

In a further non-limiting embodiment of the foregoing method, the controlled rate is at least partially based on a capacity of the torque converter.

In a further non-limiting embodiment of the foregoing method, the controlled rate corresponds to the capacity of the torque converter.

In a further non-limiting embodiment of the foregoing method, the controlled rate is a factor of the capacity of the torque converter.

In a further non-limiting embodiment of the foregoing method, the regenerative torque is gradually introduced at the controlled rate until the level of regenerative torque reaches a regenerative torque limit.

In a further non-limiting embodiment of the foregoing method, the level of regenerative torque is controlled to be equal to the regenerative torque limit when the level of regenerative torque reaches the regenerative torque limit.

In a further non-limiting embodiment of the foregoing method, the method further includes the step of controlling a level of friction braking to account for a difference between the level of regenerative torque and the braking request.

In a further non-limiting embodiment of the foregoing method, the regenerative torque is initially introduced following an initial offset.

In a further non-limiting embodiment of the foregoing method, the offset is a time less than the time it takes a torque converter to fully lock following the braking request.

In a further non-limiting embodiment of the foregoing method, the offset is a time it takes a torque converter to fully lock following the braking request.

Another exemplary aspect of this disclosure relates to a method including the step of braking a vehicle using regenerative torque to at least partially meet a braking request. The regenerative torque is gradually introduced at a controlled rate.

In a further non-limiting embodiment of the foregoing method, regenerative torque is introduced before a torque converter is fully locked.

In a further non-limiting embodiment of the foregoing method, the controlled rate is at least partially based on a capacity of the torque converter.

Yet another exemplary aspect of this disclosure relates to a system including an electric machine of an electrified vehicle, and a control unit instructing the electric machine to apply a level of regenerative torque following a braking request. The level of regenerative torque is gradually introduced at a controlled rate.

In a further non-limiting embodiment of the foregoing system, the system includes a torque converter. The torque converter selectively couples the electric machine to at least one wheel.

In a further non-limiting embodiment of the foregoing system, regenerative torque is introduced before the torque converter is fully locked.

In a further non-limiting embodiment of the foregoing system, the control unit instructs the electric machine to apply the level of regenerative torque such that the level of regenerative torque is gradually introduced at the controlled rate until the level of regenerative torque reaches a regenerative torque limit.

In a further non-limiting embodiment of the foregoing system, the control unit instructs the electric machine to apply a level of regenerative torque equal to the regenerative torque limit when the level of regenerative torque reaches the regenerative torque limit.

In a further non-limiting embodiment of the foregoing system, the system further includes friction brakes. The control unit instructs the friction brakes to apply a level of friction braking to account for a difference between the level of regenerative torque and the braking request.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 1A graphically illustrates a first prior art control scheme.

FIG. 1B graphically illustrates a second prior art control scheme.

DETAILED DESCRIPTION

This disclosure relates to a regenerative braking control scheme, and in particular to a control scheme that gradually introduces regenerative torque to minimize driveline disturbances.

Figure 2:
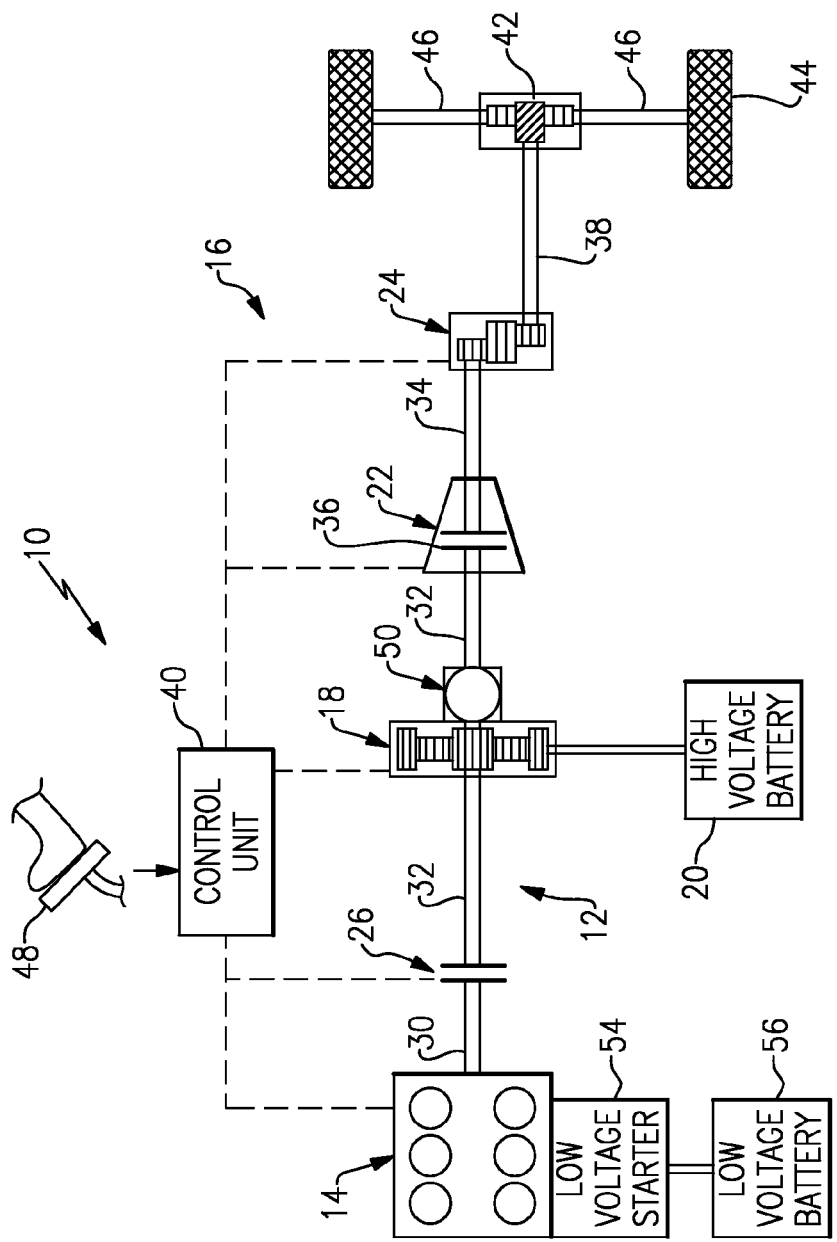
FIG. 2 schematically illustrates a powertrain of a vehicle.

FIG. 2 schematically illustrates a vehicle 10. Although illustrated as a hybrid electric vehicle (HEV) in some embodiments, the present disclosure may be applicable to other types of vehicles, including a stop/start vehicle. In addition, although a specific component relationship is illustrated in FIG. 2, this illustration is not intended to limit this disclosure. In other words, it should be readily understood that the placement and orientation of the various components of the vehicle 10 could vary within the scope of this disclosure.

The exemplary vehicle 10 includes a powertrain 12. The powertrain 12 includes an engine 14 and a transmission system 16 that is selectively driven by the engine 14. In one embodiment, the transmission system 16 is a modular hybrid transmission (MHT). The transmission system 16 can include an electric machine 18 powered by a high voltage battery 20, a torque converter 22, and a multiple-step ratio automatic transmission, or gearbox, 24. In one embodiment, the electric machine 18 is configured as an electric motor. In another embodiment, the electric machine 18 is configured as a generator or a combined motor/generator.

The engine 14 and the electric machine 18 may both be employed as available drive sources for the vehicle 10. The engine 14 generally represents a power source that may include an internal combustion engine such as a gasoline, diesel, or natural gas powered engine, or a fuel cell. The engine 14 generates power and corresponding torque that is supplied to the electric machine 18 when an engine disconnect clutch 26 that is disposed between the engine 14 and the electric machine 18 is engaged.

In some embodiments, the engine 14 is started using the electric machine 18 to rotate the engine 14. Torque for starting the engine 14 may be provided through the engine disconnect clutch 26. Alternatively, the vehicle 10 may be equipped with a low voltage starter 54 operatively connected to the engine 14, for example, through a belt or gear drive. The starter 54 may be used to provide torque to start the engine 14 without the addition of torque from the electric machine 18. The starter 54 may be powered by the high voltage battery 20, or the vehicle 10 can include a low voltage battery 56, such as a 12 V (volt) battery, to provide power to the starter 54 and/or other vehicle components.

The electric machine 18 may be any one of a plurality of types of electric machines. By way of one non-limiting embodiment, the electric machine 18 could be a permanent magnet synchronous motor.

When the engine disconnect clutch 26 is at least partially engaged, power flow from the engine 14 to the electric machine 18, or from the electric machine 18 to the engine 14, is possible. For example, the engine disconnect clutch 26 may be engaged and the electric machine 18 may operate as a generator to convert rotational energy provided by a crankshaft 30 and an electric machine shaft 32 into electrical energy to be stored in the battery 20. The engine disconnect clutch 26 can also be disengaged to isolate the engine 14 from the remainder of the powertrain 12 such that the electric machine 18 can act as the sole power source for propelling the vehicle 10.

The electric machine shaft 32 can extend through the electric machine 18. The electric machine 18 is continuously drivably connected to the electric machine shaft 32, whereas the engine 14 is drivably connected to the electric machine shaft 32 only when the engine disconnect clutch 26 is at least partially engaged.

The electric machine 18 is connected to the torque converter 22 via the electric machine shaft 32. The torque converter 22 is therefore connected to the engine 14 when the engine disconnect clutch 26 is at least partially engaged. The torque converter 22 includes an impeller fixed to the electric machine shaft 32 and a turbine fixed to a transmission input shaft 34. The torque converter 22 thus provides a hydraulic coupling between the electric machine shaft 32 and the transmission input shaft 34.

The torque converter 22 transmits power from the impeller to the turbine when the impeller rotates faster than the turbine. The magnitude of the turbine torque and impeller torque generally depend upon the relative speeds. The relative speeds of the impeller and turbine, as well as the properties of the fluid within the torque converter and the relative dimensions of the torque converter, provide a torque converter capacity. The maximum capacity of the torque converter is limited by mechanical characteristics of the torque converter, including the properties of the fluid therein. When the ratio of impeller speed to turbine speed is sufficiently high, the turbine torque is a multiple of the impeller torque.

A torque converter bypass clutch 36 may also be provided. The torque converter bypass clutch 36 in one example includes a plurality of plates, which are pressed together by in response to a hydraulic fluid pressurized by an actuator. When engaged, the torque converter bypass clutch 36 frictionally or mechanically couples the impeller and the turbine of the torque converter 22 to enable a more efficient power transfer. For purposes of this disclosure, the torque converter is considered "fully locked" when the torque converter bypass clutch 36 is not slipping. In one example, the torque converter is considered "fully locked" when the torque converter bypass clutch 36 is capacitized to a higher torque than would be expected to be applied to the torque converter bypass clutch 36 during normal operation. In one example, the torque converter would not be expected to exceed 600 N-m of torque during normal operation. Thus, if the torque converter were capacitized to 600 N-m, the torque converter would be considered "fully locked."

In another example, the torque converter is considered "soft locked" by capacitizing the torque converter bypass clutch 36 to a level marginally higher than a known level of torque, which may be a variable level of torque, being applied to the torque converter bypass clutch 36. When "soft locked," the torque converter is capacitized just enough to keep it locked, which may save energy needed for oil pressure. In other words, the torque converter need not be capacitized to 600 N-m, but is still capacitized to a level exceeding an expected level of applied torque.

The capacity of the torque converter is based on the amount of torque the torque converter clutch is capable of transmitting. For purposes of illustrating the point, if the torque converter is capacitized to transmit 200 N-m of torque, and a torque exceeding 200 N-m is applied to the torque converter, the torque converter bypass clutch 36 will begin to slip, and will only transmit 200 N-m of torque. It should be understood that, while a torque converter bypass clutch 36 is mentioned specifically herein, that this disclosure could apply to any clutch between the electric machine 18 and the wheels 44.

The torque converter bypass clutch 36 may be operated as a launch clutch to provide smooth vehicle launch. Alternatively, or in combination, a launch clutch similar to the engine disconnect clutch 26 may be provided between the electric machine 18 and the transmission gearbox 24 for applications that do not include a torque converter 22 or a torque converter bypass clutch 36. In some embodiments, the engine disconnect clutch 26 is generally referred to as an upstream clutch and the torque converter bypass clutch 36 (which may be a launch clutch) is generally referred to as a downstream clutch.

The transmission gearbox 24 may include gear sets (not shown) that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller. The transmission gearbox 24 then provides powertrain output torque to the transmission output shaft 38.

It should be understood that the hydraulically controlled transmission gearbox 24 used with a torque converter 22 is but one non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 drives a pair of wheels 44 via respective axles 46 that are connected to the differential 42. In one embodiment, the differential 42 transmits approximately equal torque to each wheel 44 while permitting slight speed differences such as when the vehicle turns a corner. Different types of differentials or similar devices may be used to distribute torque from the powertrain 12 to one or more wheels 44. In some applications, torque distribution may vary depending on the particular operating mode or condition, for example.

Pressurized fluid for the transmission system 16 may be provided by a transmission pump 50. The transmission pump 50 may be connected to or adjacent to the electric machine 18 such that it rotates with the electric machine 18 and the electric machine shaft 32 to pressurize and provide sufficient line pressure for full operation of the transmission gearbox 24. When the portion of the electric machine shaft 32 containing the transmission pump 50 is at rest, the transmission pump 50 is also at rest and is inactive.

The powertrain 12 may additionally include an associated control unit 40.

While schematically illustrated as a single controller, the control unit 40 may be part of a larger control system and may be controlled by various other controllers throughout the vehicle 10, such as a vehicle system controller (VSC) that includes a powertrain control unit, a transmission control unit, an engine control unit, etc. It should therefore be understood that the control unit 40 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque, apply a particular level of regenerative torque, or to charge the battery 20, selecting or scheduling transmission shifts, actuating the engine disconnect clutch 26, etc. In one embodiment, the various controllers that make up the VSC may communicate with one another using a common bus protocol (e.g., CAN).

The control unit 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 2, the control unit 40 may communicate signals to and/or from the engine 14, the engine disconnect clutch 26, the electric machine 18, the torque converter bypass clutch 36, the torque converter 22, the transmission gearbox 24, and/or other components. Although not explicitly illustrated, those of ordinary skill in the art will recognize various functions or components that may be controlled by the control unit within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, torque converter bypass clutch 36, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

In one example, a pedal 48, such as a brake pedal, may be used by the driver of the vehicle 10 to provide a braking request to the vehicle 10. In general, depressing and releasing the pedal 48 generates a braking pedal position signal that may be interpreted by the control unit 40 as a braking request. Based at least upon input from the pedal 48, the control unit 40 initiates a braking command, which in one example includes friction braking, regenerative braking, or a combination of friction and regenerative braking.

During regenerative braking, the electric machine 18 acts as a generator, and is driven by rotational energy from the wheels 44, which is transferred back through the transmission gearbox 24, and is then converted into electrical energy for storage in the battery 20. The act of generating power with the electric machine 18 creates a braking torque, or regenerative torque, on the electric machine 18 that is transmitted to the wheels 44 to slow the vehicle 10. As explained in detail below, the control unit 40 instructs the electric machine 18 to apply a particular level of regenerative torque. In instances where the regenerative torque applied by the electric machine 18 alone cannot meet a braking request, the control unit 40 accounts for the difference between the braking request and the level of available regenerative torque by providing friction braking (e.g., disc or drum braking).

FIGS. 1A and 1B graphically illustrate two prior art regenerative braking control schemes, as plots of braking level versus time. FIG. 1A graphically represents a system including a driveline that is locked with the wheels of the vehicle. In other words, there is either (1) no torque converter 22 between an electric machine and the wheels of the vehicle, (2) a clutch is bypassing the torque converter (such as the torque converter bypass clutch 36), or (3) a torque converter is soft locked (able to transmit applied torque).

In FIG. 1A, at time 60, a braking request 62 is initiated. In this example, the braking request 62 is fully met by regenerative torque 64 until the braking request 62 reaches a regenerative torque limit 66. The regenerative torque limit 66 is the maximum amount of regenerative torque capable of being produced by the electric machine 18. As the braking request 62 exceeds the regenerative torque limit 66, at point 68, the difference between the regenerative torque 64 and the braking request 62 is provided by friction braking 70.

In the example FIG. 1B, a torque converter, such as the torque converter 22, is provided between an electric machine 18 and the wheels 44 of a vehicle. In this example, the control unit 40 is configured to delay introduction of regenerative torque until the torque converter 22 is fully locked.

With reference to FIG. 1B, a braking request is made at time 72. Initially, the braking request 74 is met entirely by friction braking 76. At time 78, at which point the torque converter 22 is fully locked, the regenerative torque is abruptly introduced, as illustrated at line segment 80. Line segment 80 is substantially vertical, such that the level of regenerative torque is initially applied at a level equivalent to the regenerative braking limit 82. The regenerative torque is then controlled to match the regenerative torque limit, as illustrated at line segment 81. After the regenerative torque is introduced, the level of friction braking is adjusted appropriately.

Figure 3A:
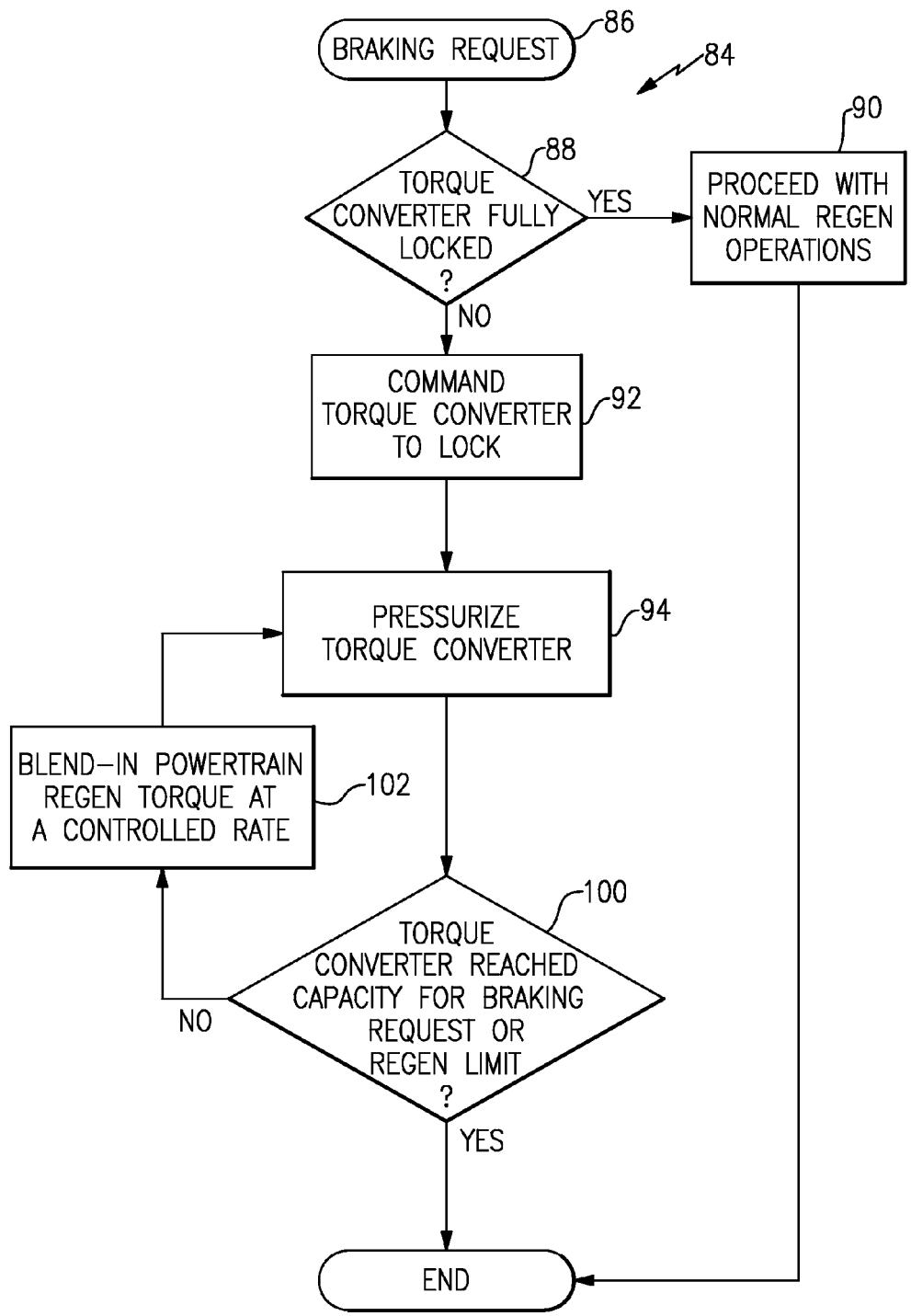
FIG. 3A is a flowchart of a first example method according to this disclosure.
Figure 3B:
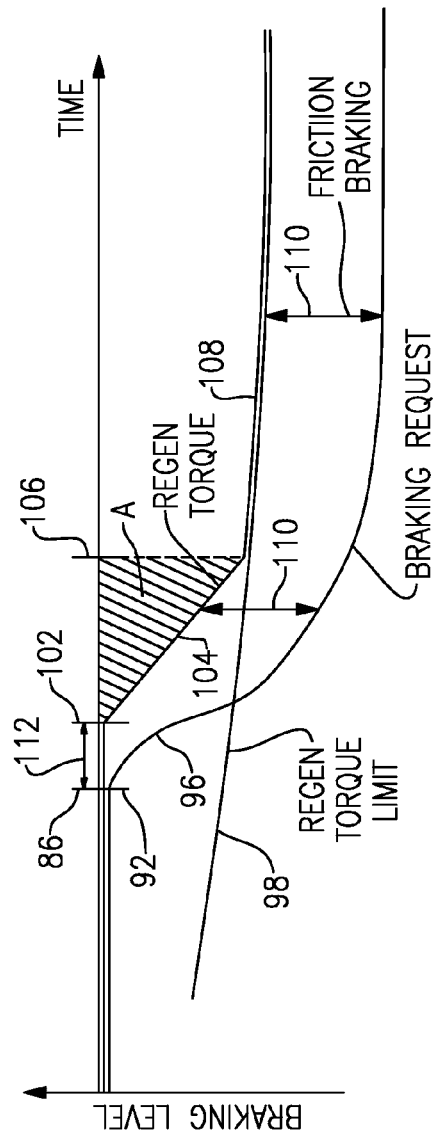
FIG. 3B graphically illustrates the method of FIG. 3A.

FIG. 3A illustrates a first example method 84 according to this disclosure. FIG. 3B graphically illustrates the method 84 as a plot of braking level versus time. The method 84 is used in connection with a vehicle including a torque converter 22, or another similar device (such as another clutch), provided between an electric machine 18 and wheels 44.

Referring jointly to FIGS. 3A and 3B, a user initiates a brake request at 86. If the torque converter 22 is locked, at 88, normal regenerative operations begin, at 90. In one example, "normal" regenerative operations may be equivalent to what is illustrated in FIG. 1A.

If the torque converter 22 is not locked at 88, however, the torque converter 22 is commanded to lock, at 92. Following this command from the control unit 40, the torque converter 22 is capacitized, at 94, prior to the introduction of any regenerative torque.

At 100, as the torque converter 22 capacitizes, the control unit 40 detects whether the torque converter 22 has reached a capacity sufficient to meet either the braking request 96 (FIG. 3B), or the regenerative torque limit 98 (FIG. 3B). In one example, the answer is initially "no." Thus, at 102, the control unit 40 instructs the electric machine 18 to apply the regenerative torque gradually, at a controlled rate, illustrated at line segment 104 in FIG. 3B. In this example, the control unit 40 maintains the controlled rate 104 until time 106 in FIG. 3B.

At time 106, the regenerative torque reaches the regenerative torque limit 98. In this example, the braking request 96 exceeds the regenerative torque limit 98. Thus, the level of regenerative torque is controlled to be equal to the regenerative torque limit, as illustrated at line segment 108. A level of friction braking 110 is provided to meet the braking request 96 in excess of the level of available regenerative torque.

In this example, there is a delay 112 between the initial braking request, at 86, and the introduction of regenerative torque, at time 102. This delay 112 allows the torque converter 22 to reach a minimum threshold capacity before the regenerative torque is applied. The delay 112 may be relatively small in some examples. Further, the delay 112 is optional, and in some examples the regenerative torque is gradually introduced at a controlled rate immediately following the initial braking request 86. During the delay, braking is accomplished by friction brakes.

In one example, the rate of introduction of the regenerative torque (e.g., the slope of line segment 104) is controlled based to prevent powertrain disturbance. In one example, the rate of introduction is controlled based on the capacity of the torque converter 22. In a particular example, the rate of introduction of the regenerative torque is controlled to be equal to the capacity of the torque converter 22. In another example, the rate is a factor of the capacity of the torque converter 22.

The braking control scheme of FIGS. 3A-3B allows the system 10 to use additional regenerative torque compared to the prior art control scheme of FIG. 1B, for example. The additional captured regenerative torque is illustrated in the area A in FIG. 3B. Using additional regenerative braking increases the life of the friction brakes, and also increases the power generated by the electric machine 18 during driving. The control scheme of FIGS. 3A-3B also allows for better drivability (e.g., by minimizing unexpected disturbances or vibrations due to changes in torque that are too sudden) by gradually introducing regenerative torque.

Figure 4B:
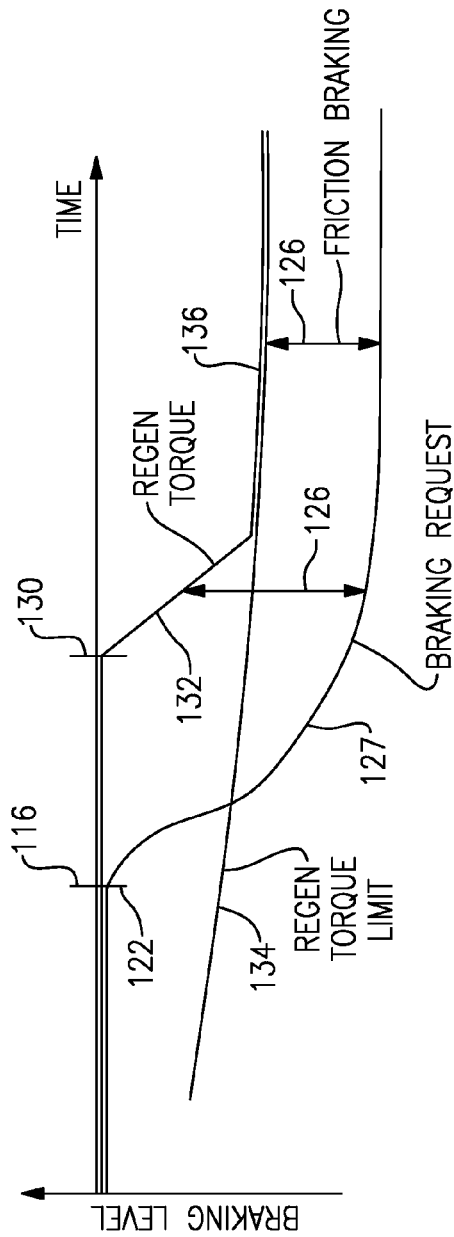
FIG. 4B graphically illustrates the method of FIG. 4A.
Figure 4A:
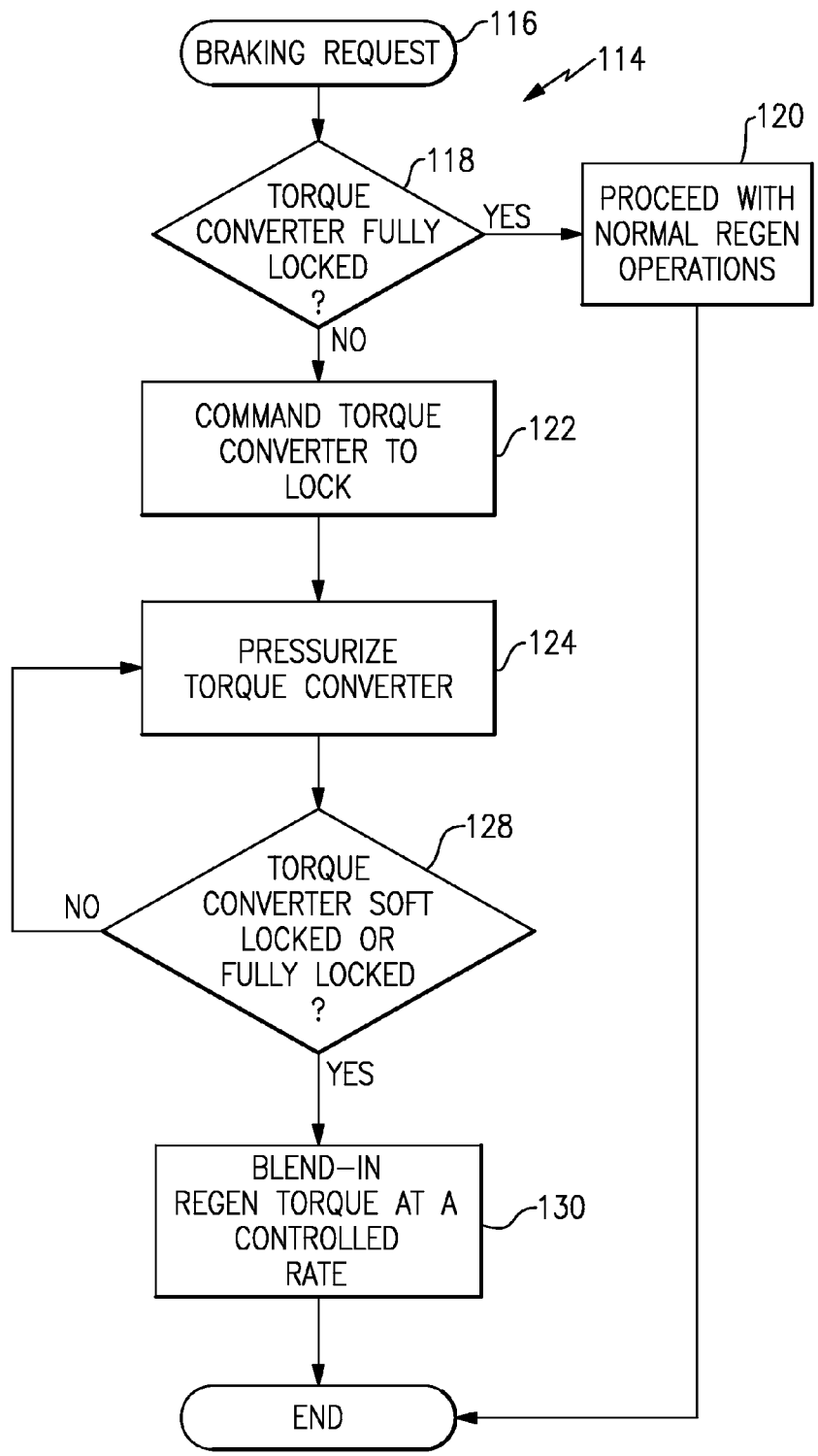
FIG. 4A is a flowchart of a second example method according to this disclosure.

FIG. 4A illustrates a second example method 114 according to this disclosure. Further, FIG. 4B graphically illustrates the method of FIG. 4A. In the example, following an initial braking event, at 116, the control unit 40 detects whether the torque converter 22 is fully locked, at 118. If the torque converter 22 is fully locked, normal regenerative braking operations take place, at 120. If not, however, the torque converter 22 is commanded to lock, at 122.

In this example, as the torque converter 22 is pressurized, at 124, friction braking 126 handles the entire braking request 127 (FIG. 4B) until the control unit 40 detects that the torque converter 22 is either soft locked or fully locked, at 128 (FIG. 4A). If the torque converter 22 is soft locked or fully locked, the regenerative torque is gradually introduced at a controlled rate, at 130. For purposes of this disclosure, the time lapse between time 116 and time 130 may be referred to as an offset.

With reference to FIG. 4B, line segment 132 illustrates the gradual introduction of the regenerative torque at the controlled rate. As in the example of FIGS. 3A-3B, regenerative torque is applied at controlled rate until the regenerative torque reaches the regenerative torque limit 134, after which point the regenerative torque is controlled to be equal to the regenerative torque limit, as illustrated at line segment 136.

In the examples of FIGS. 4A-4B, the regenerative torque may be gradually introduced at the same rate as in the example of FIGS. 3A-3B (e.g., the slope of lines 104 and 132 is the same). The rate of introduction in both examples are gradual, rather than abrupt as in the example of FIG. 1B. In this way, the examples of FIGS. 3A-3B and 4A-4B reduce driveline disturbances. Again, the example of FIGS. 3A-3B has the added benefit of allow for increased efficiency by applying a larger amount of regenerative torque (e.g., as illustrated at the area A in FIG. 3B).

It should be understood, with reference to FIGS. 3B and 4B in particular, that when the braking request is capable of being fully met by regenerative braking, that the control unit 40 may be programmed such that the entire braking request is met using regenerative braking. The examples of FIGS. 3B and 4B illustrate braking demands that exceed a regenerative braking limit. However, if the braking request were to fall below the regenerative braking limit, or if the regenerative braking limit cannot be provided (e.g., such as during the delay 112) there would be no need for friction braking.

It should be understood that terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method, comprising:
controlling a level of regenerative torque to at least partially meet a braking request, the level of regenerative torque gradually introduced at a controlled rate, wherein regenerative torque is introduced before a torque converter is fully locked.

2. The method as recited in claim 1, wherein the controlled rate is at least partially based on a capacity of the torque converter.

3. The method as recited in claim 2, wherein the controlled rate corresponds to the capacity of the torque converter.

4. The method as recited in claim 2, wherein the controlled rate is a factor of the capacity of the torque converter.

5. The method as recited in claim 1, wherein the regenerative torque is gradually introduced at the controlled rate until the level of regenerative torque reaches a regenerative torque limit.

6. The method as recited in claim 5, wherein, when the level of regenerative torque reaches the regenerative torque limit, the level of regenerative torque is controlled to be equal to the regenerative torque limit.

7. The method as recited in claim 1, further comprising:
controlling a level of friction braking to account for a difference between the level of regenerative torque and the braking request.

8. A method, comprising:
controlling a level of regenerative torque to at least partially meet a braking request, the level of regenerative torque gradually introduced at a controlled rate, wherein the regenerative torque is initially introduced following an initial offset, wherein the offset is an amount of time.

9. The method as recited in claim 8, wherein the offset is a time less than the time it takes a torque converter to fully lock following the braking request.

10. The method as recited in claim 8, wherein the offset is a time it takes a torque converter to fully lock following the braking request.

11. A method, comprising:
braking a vehicle using regenerative torque to at least partially meet a braking request, the regenerative torque gradually introduced at a controlled rate, wherein regenerative torque is introduced before a torque converter is fully locked.

12. The method as recited in claim 11, wherein the controlled rate is at least partially based on a capacity of the torque converter.

13. A system, comprising:
an electric machine of an electrified vehicle;
a control unit instructing the electric machine to apply a level of regenerative torque following a braking request, the level of regenerative torque gradually introduced at a controlled rate; and
a torque converter, wherein the torque converter selectively couples the electric machine to at least one wheel, regenerative torque is introduced before the torque converter is fully locked.

14. The system as recited in claim 13, wherein the control unit instructs the electric machine to apply the level of regenerative torque such that the level of regenerative torque is gradually introduced at the controlled rate until the level of regenerative torque reaches a regenerative torque limit.

15. The system as recited in claim 14, wherein, when the level of regenerative torque reaches the regenerative torque limit, the control unit instructs the electric machine to apply a level of regenerative torque equal to the regenerative torque limit.

16. The system as recited in claim 13, further comprising:
friction brakes, wherein the control unit instructs the friction brakes to apply a level of friction braking to account for a difference between the level of regenerative torque and the braking request.

* * * * *